United States Patent
Subhahani

(10) Patent No.: US 9,920,582 B2
(45) Date of Patent: Mar. 20, 2018

(54) WATER-BASED WELLBORE SERVICING FLUIDS WITH HIGH TEMPERATURE FLUID LOSS CONTROL ADDITIVE

(71) Applicant: Oren Hydrocarbons Private Limited, Chennai (IN)

(72) Inventor: Mahaboob Subhahani, Chennai (IN)

(73) Assignee: OREN HYDROCARBONS PRIVATE LIMITED, Chennai (IN)

( * ) Notice: Subject to any disclaimer, the term of this patent is extended or adjusted under 35 U.S.C. 154(b) by 0 days.

(21) Appl. No.: 15/316,501

(22) PCT Filed: Jun. 10, 2014

(86) PCT No.: PCT/IB2014/062108
§ 371 (c)(1),
(2) Date: Dec. 5, 2016

(87) PCT Pub. No.: WO2015/189656
PCT Pub. Date: Dec. 17, 2015

(65) Prior Publication Data
US 2017/0145296 A1    May 25, 2017

(51) Int. Cl.
| | | |
|---|---|---|
| *E21B 21/00* | (2006.01) | |
| *C09K 8/68* | (2006.01) | |
| *C09K 8/90* | (2006.01) | |
| *C09K 8/88* | (2006.01) | |
| *C09K 8/08* | (2006.01) | |

(52) U.S. Cl.
CPC .............. *E21B 21/003* (2013.01); *C09K 8/08* (2013.01); *C09K 8/685* (2013.01); *C09K 8/887* (2013.01); *C09K 8/90* (2013.01); *C09K 2208/28* (2013.01); *C09K 2208/32* (2013.01); *C09K 2208/34* (2013.01)

(58) Field of Classification Search
None
See application file for complete search history.

(56) References Cited

U.S. PATENT DOCUMENTS

| | | | |
|---|---|---|---|
| 2,702,787 A * | 2/1955 | Freeland | C09K 8/36 507/113 |
| 4,123,366 A | 10/1978 | Sauber et al. | |
| 4,652,384 A | 3/1987 | Francis et al. | |
| 5,009,267 A | 4/1991 | Williamson et al. | |
| 5,697,444 A | 2/1997 | Moorhouse et al. | |
| 5,629,271 A | 5/1997 | Dobson, Jr. et al. | |
| 5,851,959 A * | 12/1998 | Bernu | C09K 8/206 507/111 |
| 7,196,039 B2 | 3/2007 | Patel | |
| 2004/0157748 A1 | 8/2004 | Dino | |
| 2008/0300400 A1 * | 12/2008 | Berckmans | C08B 31/12 536/107 |
| 2013/0296543 A1 * | 11/2013 | Hanna | C08B 3/06 536/56 |
| 2014/0073538 A1 * | 3/2014 | Saini | C09K 8/035 507/215 |

OTHER PUBLICATIONS

International Search Report and Written Opinion dated Feb. 25, 2015 for related PCT patent application No. PCT/IB2014/062108.

* cited by examiner

*Primary Examiner* — Anuradha Ahuja
(74) *Attorney, Agent, or Firm* — D'Ambrosio & Menon, PLLC; Usha Menon

(57) ABSTRACT

A method for reducing fluid loss from a water-based wellbore servicing fluid is disclosed. The method includes preparing a fluid loss control additive that is substantially stable even at a high temperature of about 350° F. The fluid loss control additive may be formulated by dry mixing of a natural starch and sodium monochloroacetate for a first predetermined reaction time period; spraying an alkaline solution onto the dry mixture for a second predetermined reaction time period to form a complex starch mixture; and treating the complex starch mixture for a third predetermined reaction time period with a diluted cross-linking agent.

13 Claims, No Drawings

WATER-BASED WELLBORE SERVICING FLUIDS WITH HIGH TEMPERATURE FLUID LOSS CONTROL ADDITIVE

TECHNICAL FIELD

The invention relates to a fluid loss control additive. Particularly, the invention relates to a fluid loss control additive for use in water-based drilling fluids used in oil and gas applications. According to an embodiment, the fluid loss control additive is manufactured under controlled conditions with specific amounts of raw materials. The fluid loss control additive, manufactured in accordance with an embodiment, exhibits high temperature stability.

BACKGROUND

Oil and gas hydrocarbons occur in some subterranean formations. In the petroleum industry, a subterranean formation containing oil, gas, or water is referred to as a reservoir. In order to produce oil or gas, a well is drilled into a reservoir or adjacent to a reservoir. A well can include, without limitation, an oil, gas, or water production well, an injection well, or a geothermal well. A well may include at least one wellbore. The wellbore is drilled into a subterranean formation. The wellbore may be an open hole or cased hole. In an open-hole wellbore, a tubing string may be placed into the wellbore. In a cased-hole wellbore, a casing is placed into the wellbore that can also contain a tubing string. Drilling fluids may be introduced into or flowed into the wellbore through the tubing string.

In drilling oil wells, a mud-like drilling fluid is pumped into the wellbore to clean and cool the drill bit and to flush to the surface the rock cuttings that are torn loose by the drill bit. The drilling fluid must have certain physical characteristics. The most important of these is the viscosity and the water holding or retaining characteristics of the fluid. Drilling fluids lubricate and flush rotary drill bit cuttings from the wellbore. They also provide hydrostatic pressure or head in the wellbore to control pressures that may be encountered in the subterranean formations. The density or weight of the drilling fluid creates a hydrostatic pressure against the pipe that is greater than that in a porous subterranean formation traversed by the wellbore. In water-based drilling fluids, this is due to the filtrate, or water in the drilling fluid, that flows through the wellbore wall into the low pressure earth formation.

However, filtrate loss is a long-standing problem in the petroleum industry. Filtrate loss can be described as the amount of drilling fluid filtrate lost into the subterranean earth formation because of the pressure differential between the formation pressure and hydrostatic pressure of the liquid in the wellbore. A sub-optimal fluid loss control may result in creation of a bridge in a wellbore annulus opposite a permeable zone. This may result in the isolation of a lower zone from the hydrostatic pressure above the bridge. It has been observed that only a small amount of filtrate loss beneath such a bridge cause a drop in the annular pressure to below that of the formation pressure. As a result, there is an influx of formation fluids and pressure. This may create flow channels and require expensive remedial work. The lost fluid may also damage sensitive formations. It is, therefore, important to control fluid loss from wellbore servicing fluids to the surrounding formation.

SUMMARY

According to one embodiment, a method for reducing fluid loss from a water-based wellbore servicing fluid is disclosed. As described herein, the term "wellbore servicing fluid" refers to a fluid which is pumped into a well during the drilling operation. The well itself may be for gas, oil or any other purpose where such a fluid is used. According to the one or more embodiments of the invention, the wellbore servicing fluid includes, without limitation, a drilling fluid or mud, a completion fluid, a work-over fluid, a fracturing fluid, a sweeping fluid, a cement composition and/or combinations thereof. The wellbore servicing fluid may include fresh water, produced water, sea water, brines comprising sodium chloride, calcium chloride and potassium chloride, sodium formate, potassium formate, sodium bromide, calcium bromide, zinc chloride, zinc bromide and mixtures thereof.

The method includes combining a fluid loss control additive with the wellbore servicing fluid. The fluid loss control additive comprises: about 1 weight part of a starch; about 0.065 to about 0.26 weight parts of sodium monochloroacetate (SMCA); about 0.035 to about 0.14 weight parts of an alkali; about 0.009 to about 0.0036 weight parts of a solvent; about 0.0001 to about 0.0004 weight parts of a cross-linking agent; and water, wherein the water is about 100 to about 300 percent by weight of the alkali. The method further involves introducing the wellbore servicing fluid with the fluid loss control additive into a wellbore in contact with a subterranean formation. The fluid loss control additive can be formulated to substantially reduce fluid loss at a wellbore temperature ranging between ambient temperature and about 350° F. The fluid loss control additive is substantially stable at a temperature of about 350° F.

In another embodiment, a method for reducing fluid loss from a water-based wellbore servicing fluid may include preparing the fluid loss control additive disclosed earlier. The method includes the steps of: (1) dry mixing a natural starch and SMCA for a first predetermined reaction time period; (2) spraying an alkaline solution onto the dry mixture from step (1) for a second predetermined reaction time period to form a complex starch mixture; and (3) treating the complex starch mixture for a third predetermined reaction time period with a diluted cross-linking agent. The fluid loss control additive is substantially stable at a temperature of about 350° F.

The first predetermined reaction time period may be around 20 minutes to around 40 minutes. The second predetermined reaction time period may be around 45 minutes to around 75 minutes. The third predetermined reaction time period may be around 20 minutes to around 60 minutes. The formation of the complex starch mixture produces an exothermic reaction. The formation of the complex starch mixture occurs without external heating at a temperature of from about 45° C. to about 70° C.

The alkaline solution comprises about 0.035 to about 0.14 weight parts of an alkali and water, and wherein the water is about 100 to about 300 percent by weight of the alkali. The diluted cross-linking agent comprises a cross-linking agent and a solvent in a 1:4 to 1:14 ratio. The cross-linking agent is selected from the group consisting of epichlorohydrin, epoxy compounds, phosphorous oxychloride, cyanuric chloride, formaldehyde and combinations thereof. The solvent may include isopropyl alcohol, n-propyl alcohol, methyl alcohol and ethyl alcohol. The solvent may provide a suitable medium for the mixing of the cross-linking agent and the starch complex. The wellbore servicing fluid may include a monovalent or divalent brine.

The fluid loss control additive provides the wellbore servicing fluid with effective rheology at 120° F. and fluid loss control properties up to 350° F. temperature. The method further involves performing a drilling operation in a subterranean formation, and wherein the wellbore servicing fluid with the fluid loss control additive is introduced into a wellbore in contact with the subterranean formation during the drilling operation.

DETAILED DESCRIPTION

It is common and economical to use water-based wellbore servicing fluids in oil and gas well drilling operations. Water-base or water-based wellbore servicing fluids may be substantially cheaper than oil-based fluids from the standpoint of cost, maintenance and protecting the environment. Water based drilling fluid have advantages over oil based drilling fluids as additives are nonhazardous, and environmentally accepted in all the regions of world. The advantages of oil base mud in terms of shale stability, lubricity and high temperature stability can be obtained in water based mud with careful selections of materials. Filtrate loss may be controlled by increasing the filtrate viscosity to counter the normal thermal thinning of the wellbore servicing fluid that occurs at downhole temperatures. In order to reduce the loss of the fluid from the wellbore servicing fluid to the surrounding formation, additives are suggested. These additives are commonly known as fluid loss additives or "fluid loss control additives."

U.S. Pat. No. 4,123,366 discloses an additive that includes sodium carboxymethylcellulose and sodium carboxymethyl starch for use in clay-based drilling mud. The ratio of sodium carboxymethylcellulose and sodium carboxymethyl starch must be present in a ratio of 3:2 to about 19:1. U.S. Pat. No. 4,652,384 discloses a cross-linked starch based additive. However, it does not disclose that the additive is stable for use in HPHT wells at temperatures of about 350° F. U.S. Pat. No. 5,009,267 discloses a fluid loss control additive that includes a blend of two or more modified starches or a blend of one or more natural starches with one or more modified starches. U.S. Pat. No. 5,851,959 discloses a modified starch polymer having a content of amylopectin of at least 80% by weight. The patent discloses fluid loss control at a maximum temperature of 285° F. U.S. Pat. Pub. No. 2004/0157748 discloses aqueous-based drilling fluids containing a starch polymer that has an amylose content of at least 50% by weight.

Thus, the use of starch in well drilling fluid is well known. However, conventional starches tend to break down at elevated temperatures at temperatures of 225° F. or higher when subject to that temperature for an extended time period. This is problematic because high temperatures for extended periods of time are often encountered in deeper wells during the drilling process. The breakdown of conventional starch results in an increase in the consumption of the conventional starch needed in the mud.

There is, therefore, an industry requirement for a fluid loss control additive that reduces filtrate loss to the surrounding formation at high temperatures. The fluid loss control additive should not exhibit substantial loss of effectiveness in the presence of salt and should be chemically stable at temperatures ranging from ambient temperature to about 350° Fahrenheit. The fluid loss control additive should be compatible with other additives. The fluid loss control additive should not harm the rheological performance/properties and should not pose a detriment to the environment. The fluid loss control additive should be water dispersible or soluble in aqueous wellbore servicing fluids. The fluid loss control additive should exhibit optimal fluid loss control properties at normal ambient temperatures as well as over a broad temperature range, including at about 350° Fahrenheit, encountered in high pressure high temperature wells.

The fluid loss control additive, in accordance with the one or more embodiments of the invention, can be manufactured under highly controlled temperature conditions with specific measurements and compositions of raw materials. The fluid loss control additive, therefore, is a highly and precisely engineered product. It can be used with water-based well servicing fluids. The fluid loss control additive can substantially reduce fluid loss while drilling hydrocarbon bearing formations. The fluid loss control additive can be used in high pressure high temperature (HPHT) wells.

One embodiment of the invention involves manufacturing or formulating the fluid loss control additive under controlled conditions and with specific compositions of raw materials. The fluid loss control additive can be formulated by modifying raw or natural starches. The natural starch can be derived from one or more plants including, corn, wheat, maize, potato, rice, soy, sago, tapioca, or blends thereof. Waxy starches, such as, waxy maize or waxy corn may also be used. In its pure form, starch is a white, tasteless and odorless powder. It is insoluble in cold water or alcohol. Starch consists of two types of molecules: the linear and helical amylose, and the branched amylopectin. The starch used in preparing the fluid loss control additive may contain between 20%-25% amylose and between 75% to 80% amylopectin content. However, starches having a different amylose-amylopectin amount may also be used in formulating the fluid loss control additive.

According to one embodiment, the fluid loss control additive may be manufactured in a batch process as follows. About 500 parts of natural starch can be dry mixed with about 50 to 80 parts of sodium monochloro acetate ("SMCA"). This mixing may be carried out in a suitable vessel known in the art. For example, the mixing may be carried out in a double shaft paddle mixer. The mixing may be carried out for a first predetermined reaction time period. The first predetermined reaction time period may be around 20 minutes to around 40 minutes. Preferably, the first predetermined reaction time period may be around 25 minutes to around 35 minutes. The dry mixing of the powdered starch and SMCA imparts heat energy and increases the temperature of the mixture from ambient temperature to about 35° C. to about 40° C. Unlike conventional processes for manufacturing cross-linked starches, the mixing of the starch and SMCA does not require any water.

In a separate mixing tank, about 20 to 40 parts of an alkali is dissolved in about 60 to 80 parts of water. The alkali may be selected from a group consisting of sodium hydroxide, potassium hydroxide, sodium carbonate, potassium carbonate, sodium bicarbonate, and combinations thereof. Preferably, the alkali is sodium hydroxide or potassium hydroxide.

The alkaline solution prepared above is then sprayed onto the starch and SMCA mixture for a second predetermined time period. The second predetermined reaction time period is around 45 minutes to around 75 minutes. Preferably, the second predetermined reaction time period is around 55 minutes to 65 minutes. This spraying may be carried out in a suitable vessel, such as, a double shaft paddle mixer.

Alkalization and etherification reactions may take place simultaneously during this process to result in the formation of a complex starch mixture. In the alkalization reaction, starch is reacted with the alkali and alkaline starch is formed. The exothermic reaction and mechanical mixing raises the temperature of the complex starch mixture to about 55° C.-60° C. No external heat is required during the mixing and spraying steps.

Upon completion of the above steps, the resultant complex starch mixture is cross-linked with a small amount, about 0.05 to about 0.15 parts, of a cross-linking agent in the presence of a suitable solvent at the mixture temperature of 55° C.-60° C. The cross-linking agent can be selected from the group consisting of epichlorohydrin, epoxy compounds, phosphorous oxychloride, cyanuric chloride, formaldehyde and combinations thereof. The solvent may be selected from the group consisting of isopropyl alcohol, methanol, ethanol, n-propyl alcohol or any other suitable solvent. The amount of the solvent may be about 0.8 to 1 part.

The cross-linked starch mixture may be kept under mixing for a third predetermined reaction time period. The third predetermined reaction time period may be about 20 minutes to about 60 minutes to achieve a desired cross-linking of the starch. Preferably, the third predetermined reaction time period may be about 30 minutes to about 45 minutes. This cross-linking step is vital to impart a low shear rate viscosity and high temperature stability to the fluid loss control additive.

The cross-linked starch mixture formed after the cross-linking step may have around 20%-25% moisture content. The cross-linked starch mixture may be completely or at least partially dried in a suitable drying apparatus known in the art. For example, the cross-linked starch mixture may be dried in a paddle drier. The drying can also be accomplished by a heated drum dryer or extruder. The drying temperature may be maintained between 90° C. and 110° C. depending on the moisture present in the raw materials constituting the cross-linked mixture. The cross-linked starch mixture may be continued to be dried until its moisture content may be reduced by 6% to about 10%.

The dried cross-linked starch mixture may be milled to a particle size conventionally used in wellbore servicing fluids. The cross-lined starch mixture may also be fed into a micro pulverizer where it is pulverized to a desired particle size. The desired particle size may be dictated by the characteristics of the subterranean formation and the properties of the wellbore servicing fluid. The resulting powdered mixture is screened through vibrating sieves to separate out coarse powder from fine powder. The fine powder may be packaged by a suitable packaging machine for use as a fluid loss control additive. Advantageously, the manufacturing process does not generate any harmful by-products or effluent waste.

During the manufacturing process, in accordance with the embodiment described above, it is critical to maintain the specific amounts of the various raw materials. For example, the amounts of alkali and SMCA, must be controlled in order to ensure that the fluid loss control additive is stable at high temperatures up to 350° F. Similarly, the amount of the cross-linking agent, the reaction temperatures and the first, second and third predetermined reaction times must be controlled in order to increase thermal stability of fluid loss control additive and to ensure its non-detrimental rheological performance at higher temperature conditions.

The fluid loss control additive, manufactured in accordance with the above embodiment, may include about 1 weight part of the starch; about 0.065 to about 0.26 weight parts of sodium monochloroacetate (SMCA); about 0.035 to about 0.14 weight parts of the alkali; about 0.009 to about 0.0036 weight parts of the solvent; about 0.0001 to about 0.0004 weight parts of a cross-linking agent; and water, wherein the water is about 100 to about 300 percent by weight of the alkali. In order to achieve the desired high temperature stability, in one or more embodiments, the fluid loss control additive may consist essentially of the specific composition of raw materials described above, namely, 1 weight part of the starch; about 0.065 to about 0.26 weight parts of SMCA; about 0.035 to about 0.14 weight parts of the alkali; about 0.009 to about 0.0036 weight parts of the solvent; about 0.0001 to about 0.0004 weight parts of a cross-linking agent; and water, wherein the water is about 100 to about 300 percent by weight of the alkali.

The fluid loss control additive, manufactured in accordance with the above embodiment, was tested as per API 13A test procedures for water-based wellbore servicing fluids. The effectiveness of the product is checked by the American Petroleum Institute (API) Fluid Loss Test after static aging of sample drilling fluids containing the starch at elevated temperatures.

In one embodiment, a method for reducing fluid loss from a water-based wellbore servicing fluid involves combining or adding the fluid loss control additive manufactured in accordance with an embodiment of the invention with the wellbore servicing fluid. It will be understood that in practice the amount of the fluid loss control additive added to the wellbore servicing fluid will be different for different drilling operations and each operator can use a particular or sufficient amount which they believe to be superior. The wellbore servicing fluid with the additive may be introduced into a wellbore in any number of ways known to those skilled in the art.

In another embodiment, a method for drilling a well involves employing a water-based wellbore servicing fluid which includes the fluid loss control additive manufactured in accordance with the embodiment of the invention.

The wellbore servicing fluid may also include dispersants, such as, surfactants that improve flowability. For example, sorbitan monooleate, polyoxyethylene sorbitan monooleate, ethoxylated butanol, and ethoxylated nonyl phenol, as well as various blends of these surfactants may be added to the wellbore servicing fluid. The wellbore servicing fluid may further include at least one component selected from a group consisting of weighting agents, oxygen scavengers, biocides, pH modifiers, viscosifiers, corrosion inhibitors, lubricants, friction inhibitors, scale inhibitors, and high temperature stabilizers. It is understood that not all of the possible components may be present in any one wellbore servicing fluid but their selection and use will differ for different drilling operations and each operator will use different components depending on the situation.

The fluid loss control additive may reduce fluid loss by viscosifying the filtrate. The fluid loss control additive may be used along with other additives. When required, viscosifying agents may be added to assist the fluid loss control additive to provide cleaning of the wellbore and improve suspension properties.

The fluid loss control additive may be used in aqueous wellbore servicing fluids. Such fluids may be required for drilling water-sensitive shares. The aqueous wellbore servicing fluids may be water or substantially any aqueous solution. Examples include natural waters or brines or sea waters and/or waters softened or otherwise treated by means of ion exchange resins, flocculating agents, etc. Brine is a generic term for water containing a salt such as a sodium, potassium, or calcium salt.

The fluid loss control additive may promote well bore stability, rheological control and fluid loss control. The fluid loss control additive manages the amount of wellbore servicing fluid used in downhole operations.

A result of inclusion of the fluid loss control additive may be better pumpability characteristics of the wellbore servicing fluid. This may improve removal of the fluid while reducing the possibility of lost circulation.

The wellbore servicing fluid may contain at least one inorganic or organic salt. For example, the wellbore servicing fluid may include inorganic monovalent and polyvalent metal salts, such as calcium chloride, sodium chloride, potassium chloride, magnesium chloride, sodium formate. potassium formate, sodium bromide, potassium bromide, zinc chloride, zinc bromide, and ammonium chloride.

The wellbore servicing fluid can substantially reduce fluid loss without permanently plugging or otherwise damaging the rheological formation.

The fluid loss control additive may cause substantial reductions in the rate of water/fluid loss by filtration. The fluid loss control additive is easily mixable. The fluid loss control additive exhibits enhanced stability at very high temperatures.

Conventional additives used in drilling operations start to degrade above 275° F., however, the fluid loss additive, in accordance with the one or more embodiments of the invention, has been found to be stable at even temperatures of about 350° F. Since exploration and production activities can involve operations in high temperature conditions, the fluid loss control additive of the invention may be highly suitable for use even in high temperature well conditions.

The fluid loss control additive is non-hazardous and is readily biodegradable after completion of the desired treatment process involving the fluid loss control additive. Accordingly, the fluid loss control additive can be used with confidence in environmentally sensitive areas or in areas where the emphasis on environmental protection is critical.

Advantageously, the fluid loss control additive, as described herein, is formulated with a renewable resource, such as, natural starch. Accordingly, it may be more cost effective and environmentally safe when compared to expensive and non-eco-friendly synthetic polymer-based additives. Such polymer-based additives may also not be suitable for high temperature applications above 250° F. Additionally, these polymer-based additives may only be soluble in oil-based (and not in water-based) wellbore servicing fluids unlike the fluid loss control additive described here in accordance with the one or more embodiments of the invention.

When synthetic polymer-based additives are used in the wellbore, a high concentration of oil wet solids may be deposited on the face of the wellbore and the casing. Cleaning up this buildup may be expensive. Since the fluid loss control additive, described here in accordance with the one or more embodiments of the invention, is formulated with a natural starch, it can substantially minimize the wellbore cleanup related issues associated with synthetic polymer-based additives.

Exemplary test results have been described below.

EXAMPLE 1

The fluid loss control properties of a base-pregel starch and an embodiment of the high temperature stable fluid loss control agent of the invention were compared by introducing both additives into potassium formate mud systems. The other components in the mud systems, the mixing order of the other components in the mud systems, and the mixing time of the other components are kept virtually identical. As can be seen in Table 1, the fluid loss control exhibited by the base-pregel starch is uncontrolled at 350° F. On the other hand, the filtrate loss exhibited by the mud system that includes an embodiment of the high temperature stable fluid loss control agent of the invention is around a low 6.8 ml at 350° F.

TABLE 1

| Mixing order of Components | Time in min | Base-Pregel Starch Potassium formate mud | HT Fluid Loss Control Agent Potassium formate mud |
|---|---|---|---|
| Water, bbl | — | 0.369 | 0.369 |
| Potassium Formate, ppb | 2 | 256.7 | 256.7 |
| Sodium Formate, ppb | 2 | 76 | 76 |
| Xanthan bio-polymer dispersed, ppb | 10 | 1 | 1 |
| Pregel starch Fluid loss agent, ppb | | 8 | — |
| HT Fluid loss control agent, ppb | 5 | — | 8 |
| Soda ash ppb | 5 | 3 | 3 |
| Sodium bicarbonate, ppb | 5 | 2 | 2 |
| CaCO3 M, ppb | — | 15 | 15 |
| CaCO3 F, ppb | — | 15 | 15 |
| Polymeric temperature stabiliser, ppb | 5 | 2 | 2 |

| Fluid properties | | | | |
|---|---|---|---|---|
| | Before | After | Before | After |
| Rolled at 350° F., hrs | — | 16 | — | 16 |
| Mud weight, ppg | 11.7 | 11.7 | 11.7 | 11.7 |

| Fann 35 rheology at 120° F. | | | | |
|---|---|---|---|---|
| 600 rpm | 88 | 130 | 70 | 90 |
| 300 rpm | 52 | 59 | 45 | 60 |
| 200 rpm | 40 | 65 | 38 | 47 |
| 100 rpm | 26 | 42 | 26 | 33 |
| 6 rpm | 5.5 | 10 | 8 | 10 |
| 3 rpm | 2.5 | 8 | 6 | 8 |
| PV, cP | 36 | 44 | 25 | 30 |
| Yield point, lb/100 ft$^2$ | 16 | 42 | 20 | 30 |
| 10-sec gel, lb/100 ft$^2$ | 4 | 10 | 6 | 8 |
| 10-min gel, lb/100 ft$^2$ | 6 | 12 | 8 | 8 |
| pH | 12.13 | 12.1 | 10.10 | 10.18 |
| API fluid loss in ml | 1 | 1 | 2.0 | 1.9 |

| HTHP fluid loss testing at 350° F. temperature | | |
|---|---|---|
| HTHP differential pressure psi | 500 | 500 |
| HTHP filtrate in ml | Uncontrolled | 6.8 |

EXAMPLE 2

The fluid loss control properties of a base-pregel starch and an embodiment of the high temperature stable fluid loss control agent of the invention were compared by introducing both additives into potassium chloride mud systems. The other components in the mud systems, the mixing order of the other components in the mud systems, and the mixing time of the other components are kept virtually identical. As can be seen in Table 2, the fluid loss control exhibited by the base-pregel starch is uncontrolled at 350° F. On the other hand, the filtrate loss exhibited by the mud system that includes an embodiment of the high temperature stable fluid loss control agent of the invention is around a low 7.8 ml at 350° F.

TABLE 2

| Mixing order of Components | Time in min | Base-Pregel Starch Potassium chloride mud | HT Fluid Loss Control Agent Potassium chloride mud |
|---|---|---|---|
| 5% Potassium Chloride, bbl | 2 | 0.914 | 0.914 |
| MgO, ppb | 1 | 1.2 | 1.2 |
| Xanthan bio-polymer dispersed, ppb | 10 | 1.75 | 1.75 |
| Pregel starch Fluid loss agent, ppb | | 6.3 | — |
| HT Fluid loss control agent, ppb | 5 | — | 6.3 |
| CaCO3 M, ppb | ,— | 15 | 15 |
| CaCO3 F, ppb | ,— | 15 | 15 |
| Polymeric temperature stabiliser, ppb | 5 | 1 | 1 |

| Fluid properties | | | | |
|---|---|---|---|---|
| | Before | After | Before | After |
| Rolled at 300° F., hrs | — | 16 | — | 16 |
| Mud weight, ppg | 8.7 | 9.1 | 8.7 | 9.1 |

| Fann 35 rheology at 120° F. temperature | | | | |
|---|---|---|---|---|
| 600 rpm | 46 | 38 | 57 | 42.5 |
| 300 rpm | 34 | 28 | 43 | 33.5 |
| 200 rpm | 28 | 23 | 39.5 | 27 |
| 100 rpm | 20 | 16 | 31.5 | 19.5 |
| 6 rpm | 9 | 5 | 17 | 5 |

TABLE 2-continued

| Mixing order of Components | Time in min | Base-Pregel Starch Potassium chloride mud | HT Fluid Loss Control Agent Potassium chloride mud |
|---|---|---|---|
| 3 rpm | 7 | 3 | 16 | 3.5 |
| PV, cP | | 12 | 10 | 14 | 9 |
| Yield point, lb/100 ft² | | 22 | 18 | 29 | 24.5 |
| 10-sec gel, lb/100 ft² | | 8 | 4 | 15.5 | 3 |
| 10-min gel, lb/100 ft² | | 10 | 6 | 16.5 | 3.5 |
| pH | | 9.7 | 9.7 | 9.8 | 9.2 |
| API fluid loss in ml | | 5.4 | 5.4 | 6.8 | 7.2 |

| HTHP fluid loss testing at 350° F. temperature | | |
|---|---|---|
| HTHP differential pressure psi | 500 | 500 |
| HTHP filtrate ml | Uncontrolled | 7.8 |

EXAMPLE 3

The fluid loss control properties of a base-pregel starch and an embodiment of the high temperature stable fluid loss control agent of the invention were compared by introducing both additives into sodium chloride mud systems. The tests were carried out by varying the amount of water and CaCO3 in the mud systems. The other components in the mud systems, the mixing order of the other components in the mud systems, and the mixing time of the other components are kept virtually identical. As can be seen in Table 3, the fluid loss control exhibited by the base-pregel starch is uncontrolled at 300° F. and 350° F. On the other hand, the filtrate loss exhibited by the mud system that includes an embodiment of the high temperature stable fluid loss control agent of the invention is lower than 9 ml.

TABLE 3

| Mixing order of Components | Time in min. | Base-Pregel Starch Quantity | HT Fluid Loss Control Agent Quantity | Base Pregel Starch Quantity | HT Fluid Loss Control Agent Quantity |
|---|---|---|---|---|---|
| Water ml (bbl) | | 301 (0.86) | 301 (0.86) | 294 (0.84) | 294 (0.84) |
| Nacl ppb | 2 | 82 | 82 | 82 | 82 |
| Xanthan bio-polymer dispersed, ppb | 10 | 0.75 | 0.75 | 1.5 | 1.5 |
| HT Fluid loss agent, ppb | 5 | | 7 | | 6 |
| Pregel starch Fluid loss agent, ppb | | 7 | | 6 | |
| MgO ppb | 3 | 0.5 | 0.5 | 2 | 2 |
| Polymeric temperature stabiliser, ppb | 5 | 1 | 1 | 2 | 2 |
| CaCO3 M ppb | 5 | 15 | 15 | 45 | 45 |
| CaCO3 F ppb | 5 | 15 | 15 | 5 | 5 |

| Fluid properties | | | | | | | | | |
|---|---|---|---|---|---|---|---|---|---|
| | Before | After | Before | After | Before | After | After | Before | After | After |
| Hot rolled Temperature ° F. | ,- | 300 | ,- | 300 | — | 250 | 300 | — | 250 | 300 |
| Hot rolled for, hrs | ,- | 16 | ,- | 16 | — | 16 | 16 | — | 16 | 16 |
| Mud weight, ppg | 10 | 10 | 10 | 10 | 10.6 | 10.65 | 10.6 | 10.6 | 10.65 | 10.7 |

| FANN 35 rheology at 120° F. | | | | | | | | | |
|---|---|---|---|---|---|---|---|---|---|
| 600 rpm | 35 | 18 | 57 | 43.5 | 64 | 61 | 35 | 79 | 82.5 | 56 |
| 300 rpm | 22 | 12 | 41.5 | 32 | 44 | 42 | 22 | 60 | 63 | 42 |

TABLE 3-continued

| | | | | | | | | | | |
|---|---|---|---|---|---|---|---|---|---|---|
| 200 rpm | 18 | 10 | 34 | 23.5 | 36 | 33.5 | 18 | 51 | 54 | 36 |
| 100 rpm | 12 | 6 | 25 | 17 | 25 | 22 | 12 | 42 | 44 | 29 |
| 6 rpm | 4 | 2 | 11 | 8.5 | 8 | 6 | 5 | 20 | 20 | 12 |
| 3 rpm | 2 | 1 | 11 | 8.5 | 6 | 4 | 4 | 19 | 19 | 11 |
| PV, cP | 13 | 6 | 15.5 | 11.5 | 20 | 19 | 13 | 19 | 19.5 | 14 |
| Yield point, lb/100 ft2 | 9 | 6 | 26 | 205 | 24 | 23 | 9 | 41 | 43.5 | 28 |
| 10-sec gel, lb/100 ft2 | 3 | 2 | 9 | 6.5 | 8 | 7 | 5 | 19 | 19 | 11 |
| 10-min gel, lb/100 ft2 | 5 | 3 | 11 | 8 | 10 | 9 | 7 | 19.5 | 19.5 | 11 |
| PH | 10.26 | 9.38 | 9.4 | 8.9 | 10.1 | 9.84 | 9.21 | 9.86 | 9.8 | 9.56 |
| API FLUID LOSS, ml | 5.4 | Uncontrolled | 4.8 | 3.8 | 3.2 | 12 | Uncontrolled | 5.8 | 4.4 | 3.8 |
| HTHP filtration loss testing | | | | | | | | | | |
| HTHP Temperature ° F. | — | 350 | — | 350 | — | 300 | 350 | — | 300 | 350 |
| Differential Pressure psi | — | 500 | — | 500 | — | 500 | 500 | — | 500 | 500 |
| HPHT filtrate loss ml | — | Uncontrolled | — | 8.8 | — | Uncontrolled | Uncontrolled | — | 5.8 | 6.8 |

EXAMPLE 4

The fluid loss control properties of a base-pregel starch and an embodiment of the high temperature stable fluid loss control agent of the invention were compared by introducing both additives into calcium chloride mud systems. The tests were carried out by varying the weights of the mud systems at different brine concentrations. The other components in the mud systems, the mixing order of the other components in the mud systems, and the mixing time of the other components are kept virtually identical. As can be seen in Table 4, the fluid loss control exhibited by the base-pregel starch is uncontrolled at a temperature of 300° F. On the other hand, the filtrate loss exhibited by the mud system that includes an embodiment of the high temperature stable fluid loss control agent of the invention is 6 ml. or lower at temperatures of 300° F. and 350° F.

TABLE 4

| | | Base-Pregel Starch | | HT Fluid Loss Control Agent | |
|---|---|---|---|---|---|
| SAMPLE COMPOSITION | Time (min) | 10.9 ppg CaCl2 brine | 11.9 ppg CaCl2 brine | 10.9 ppg CaCl2 brine | 11.9 ppg CaCl2 brine |
| CaCl2 Brine 10.5 ppg, bbl | 2 | 0.91 | — | 0.91 | — |
| CaCl2 Brine 11.3 ppg, bbl | 2 | — | 0.91 | — | 0.91 |
| Xanthan bio-polymer dispersed, ppb | 5 | 1.5 | 1.5 | 1.5 | 1.5 |
| HT Fluid loss control agent, ppb | 5 | | | 6 | 6 |
| Pregel starch Fluid loss agent, ppb | | 6 | 6 | — | — |
| MgO, ppb | 5 | 2 | 2 | 2 | 2 |
| Polymeric temperature stabiliser, ppb | 5 | 2 | 2 | 2 | 2 |
| CaCO3 F, ppb | 2 | 5 | 5 | 5 | 5 |
| CaCO3 M, ppb | 2 | 45 | 45 | 45 | 45 |
| Fluid properties | | | | | |
| Hot rolled Hrs | | 16 | 16 | 16 | 16 |

| HOT ROLL TEMPERATURE ° F. | Initial | 250 | 300 | Initial | 250 | 300 | Initial | 250 | 300 | Initial | 250 | 300 |
|---|---|---|---|---|---|---|---|---|---|---|---|---|
| Mud Weight, ppg | 10.9 | 10.8 | 10.9 | 11.85 | 11.8 | 11.8 | 10.9 | 11.1 | 11.0 | 11.85 | 11.95 | 12.0 |
| FANN 35 RHEOLOY AT 120° F. | | | | | | | | | | | | |
| 600 RPM | 96 | 65 | 16 | 38 | 36 | 10 | 144 | 100 | 97 | 27 | 160 | 108 |
| 300 RPM | 60 | 41 | 10 | 24 | 23 | 6 | 110 | 67.5 | 64 | 17 | 111 | 70 |
| 200 RPM | 45 | 32 | 8 | 18 | 19 | 4 | 85 | 53.5 | 50 | 11 | 93 | 56 |
| 100 RPM | 27 | 20 | 5 | 12 | 13 | 2 | 60 | 40 | 35 | 7 | 63 | 41 |
| 6 RPM | 5 | 4 | 2 | 4 | 5 | 1 | 20 | 9.5 | 6 | 1 | 21 | 9 |
| 3 RPM | 3 | 3 | 1 | 3 | 3 | 0 | 17.5 | 7.5 | 5 | 1 | 16.5 | 7 |
| GELS 10" lbs/100 ft2 | 5 | 4 | 2 | 4 | 4 | 0 | 17 | 7.5 | 5 | 1 | 16 | 7 |
| GELS 10' lbs/100 ft2 | 7 | 5 | 3 | 5 | 6 | 1 | 18.5 | 9.5 | 6 | 1 | 19 | 9 |
| APPARENT VISC · cP | 48 | 32.5 | 8 | 19 | 18 | 5 | 72 | 50 | 43.5 | 13.5 | 80 | 54 |
| PLASTIC VISC cP. | 36 | 24 | 6 | 14 | 13 | 4 | 34 | 32.5 | 33 | 10 | 42 | 38 |
| YIELD POINT lbs/100 ft2 | 24 | 17 | 4 | 10 | 10 | 2 | 76 | 35 | 31 | 7 | 62 | 32 |
| pH | 8.9 | 8.15 | 7.8 | 8.53 | 8.34 | 7.72 | 8.5 | 8.36 | 8.32 | 7.95 | 7.83 | 7.8 |
| API FLUID LOSS ml | 3 | 5 | Uncontrolled | 4 | 5 | Uncontrolled | 3.40 | 3.20 | 4.60 | 1.8 | 2.2 | 4.0 |

TABLE 4-continued

HTHP filtration loss testing

| Pressure psi | 500 | 500 | 500 | 500 | 500 | 500 | 500 | 500 |
|---|---|---|---|---|---|---|---|---|
| Temperature ° F. | 250 | 300 | 250 | 300 | 300 | 350 | 300 | 350 |
| Fluid Loss ml | 23 | Uncontrolled | 33 | Uncontrolled | 5.4 | 5.2 | 3.6 | 6.0 |

EXAMPLE 5

The fluid loss control properties of a base-pregel starch and an embodiment of the high temperature stable fluid loss control agent of the invention were compared by introducing both additives into calcium bromide mud systems. The tests were carried out at the same brine concentration levels. The other components in the mud systems, the mixing order of the other components in the mud systems, and the mixing time of the other components are kept virtually identical. As can be seen in Table 5, the fluid loss control exhibited by the base-pregel starch is uncontrolled at a temperature of 300° F. On the other hand, the filtrate loss exhibited by the mud system that includes an embodiment of the high temperature stable fluid loss control agent of the invention is 6 ml. or lower at temperatures of 300° F. and 350° F.

These test results are, however, merely illustrative of the invention and those skilled in the art will recognize that many other variations may be employed within the teachings provided herein. Such variations are considered to be encompassed within the scope of the invention as set forth in the following claims.

As used herein, the words "comprise," "have," "include," and all grammatical variations thereof are each intended to have an open, non-limiting meaning that does not exclude additional elements or steps. As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas.

Viscosity is an example of a physical property of a fluid. The viscosity of a fluid is the dissipative behavior of fluid flow and includes, but is not limited to, kinematic viscosity, shear strength, yield strength, surface tension, viscoplasticity, and thixotropicity. Viscosity is commonly expressed in

TABLE 5

| SAMPLE COMPOSITION | Time (min) | Base-Pregel Starch 14.7 ppg CaBr2 brine | | | HT Fluid Loss Control Agent 14.7 ppg CaBr2 brine | | |
|---|---|---|---|---|---|---|---|
| CaBr2 Brine 14.2 ppg, bbl | 8 | 0.91 | | | 0.91 | | |
| Xanthan biopolymer, ppb | 5 | 1.5 | | | 1.5 | | |
| HT Fluid loss control agent, ppb | 5 | | | | 6 | | |
| Pregel starch Fluid loss agent ppb | | 6 | | | | | |
| MgO, ppb | 5 | 2 | | | 2 | | |
| Polymeric temperature stabiliser, ppb | 5 | 2 | | | 2 | | |
| CaCO3 F, ppb | 2 | 5 | | | 5 | | |
| CaCO3 M, ppb | 2 | 45 | | | 45 | | |
| Hot rolled in Hrs | | 16 | | | 16 | | |
| HOT ROLL TEMPERATURE ° F. | | Initial | 250 | 300 | Initial | 250 | 300 |
| Mud Weight, ppg | | 14.6 | 14.8 | 14.8 | 14.6 | 14.7 | 14.7 |
| FANN 35 RHEOLOY AT 120° F. | | | | | | | |
| 600 RPM | | 66 | 49 | 20 | >300 | 205 | 180.5 |
| 300 RPM | | 36 | 39 | 11 | >300 | 124 | 119 |
| 200 RPM | | 24 | 25 | 9 | 292 | 98 | 93 |
| 100 RPM | | 13 | 17 | 6 | 188 | 60 | 61.5 |
| 6 RPM | | 3 | 6 | 3 | 59.5 | 11 | 8.5 |
| 3 RPM | | 1 | 3 | 2 | 48.5 | 7.5 | 5.5 |
| GELS 10" lbs/100 ft2 | | 2 | 2 | 1 | 46 | 9 | 5 |
| GELS 10' lbs/100 ft2 | | 5 | 3 | 2 | 62 | 11 | 7.5 |
| APPARENT VISC · cP | | 33 | 24.5 | 10 | NA | 102.5 | 90.25 |
| PLASTIC VISC cP. | | 30 | 10 | 9 | NA | 81 | 61.5 |
| YIELD POINT lbs/100 ft2 | | 6 | 29 | 2 | NA | 43 | 51.5 |
| pH | | 6.1 | 6.13 | 5.84 | 7.87 | 7.64 | 7.0 |
| API FLUID LOSS ml | | Uncontrolled | Uncontrolled | Uncontrolled | 3.0 | 2.4 | 2.6 |
| HTHP filtration loss testing | | | | | | | |
| Pressure psi | | | 500 | 500 | | 500 | 500 |
| Temperature ° F. | | | 250 | 300 | | 300 | 350 |
| Fluid Loss ml | | Uncontrolled | Uncontrolled | Uncontrolled | | 4.4 | 6.0 | units of centipoise (cP), which is 1/100 poise. One poise is equivalent to the units of dyne-sec/cm².

It should be understood that, as used herein, "first," "second," "third," etc., and are arbitrarily assigned and are merely intended to differentiate between two or more reaction times, etc., as the case may be, and does not indicate any particular sequence. Furthermore, it is to be understood that the mere use of the term "first" does not require that there be any "second," and the mere use of the term "second" does not require that there be any "third," etc.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of formulation herein described, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

The invention claimed is:

1. A method for reducing fluid loss from a water-based wellbore servicing fluid, comprising:
   preparing a fluid loss control additive comprising:
   (1) dry mixing a natural starch and sodium monochloroacetate (SMCA) for a first predetermined reaction time period to form a dry mixture, wherein the first predetermined reaction time period is around 20 minutes to around 40 minutes, and wherein the starch is selected from the group consisting of corn, wheat, rice, maize, waxy maize, potato, sago, soy, tapioca, and blends thereof;
   (2) alkalization of the dry mixture by spraying an alkaline solution onto the dry mixture from step (1) for a second predetermined reaction time period to form a complex starch mixture, wherein the alkaline solution comprises about 20 to 40 parts of an alkali dissolved in about 60 to 80 parts of water, wherein the alkali is selected from the group consisting of sodium hydroxide, potassium hydroxide, sodium carbonate, potassium carbonate, sodium bicarbonate, and combinations thereof, and wherein the second predetermined reaction time period is around 45 minutes to around 75 minutes; and
   (3) treating the complex starch mixture for a third predetermined reaction time period with a diluted cross-linking agent to form a cross-linked starch mixture, wherein the third predetermined reaction time period is around 20 minutes to around 60 minutes, and wherein the diluted cross-linking agent comprises a cross-linking agent and a solvent in a 1:9 ratio,
   combining the fluid loss control additive with the wellbore servicing fluid, wherein the wellbore servicing fluid comprises a monovalent or divalent brine; and
   performing a drilling operation in a subterranean formation, wherein the wellbore servicing fluid with the fluid loss control additive is introduced into a wellbore in contact with the subterranean formation during the drilling operation.

2. The method according to claim 1, wherein the formation of the complex starch mixture produces an exothermic reaction.

3. The method according to claim 1, wherein the formation of the complex starch mixture occurs without external heating at a temperature of from about 45° C. to about 70° C.

4. The method according to claim 1, wherein the cross-linking agent is selected from the group consisting of epichlorohydrin, epoxy compounds, phosphorous oxychloride, cyanuric chloride, formaldehyde and combinations thereof, and wherein the solvent is selected from the group consisting of isopropyl alcohol, n-propyl alcohol, methyl alcohol and ethyl alcohol.

5. The method according to claim 1, wherein the fluid loss control additive comprises:
   about 1 weight part of the starch;
   about 0.065 to about 0.26 weight parts of the SMCA;
   about 0.035 to about 0.14 weight parts of an alkali,
   about 100 to about 300 percent of water by weight of the alkali; and
   about 0.0001 to about 0.0004 weight parts of the cross-linking agent,
   wherein the fluid loss control additive is configured to provide the wellbore servicing fluid with fluid loss control properties at a temperature of up to 350° F.

6. A method for reducing fluid loss from a water-based wellbore servicing fluid, comprising:
   preparing a fluid loss control additive comprising:
   (1) dry mixing a natural starch and sodium monochloroacetate (SMCA) for a first predetermined reaction time period to form a dry mixture, wherein the first predetermined reaction time period is around 20 minutes to around 40 minutes, and wherein the dry mixing of the natural starch and SMCA imparts heat energy and increases the temperature of the dry mixture from ambient temperature to a temperature from about 35° C. to about 40° C.;
   (2) alkalization of the dry mixture by spraying an alkaline solution onto the dry mixture from step (1) for a second predetermined reaction time period to form a complex starch mixture, wherein the alkaline solution comprises about 20 to 40 parts of an alkali dissolved in about 60 to 80 parts of water, wherein the second predetermined reaction time period is around 45 minutes to around 75 minutes, and wherein the temperature of the complex starch mixture is raised to a temperature from about 55° C. to about 60° C. without external heating;
   (3) treating the complex starch mixture for a third predetermined reaction time period with a diluted cross-linking agent to form a cross-linked starch mixture, wherein the third predetermined reaction time period is around 20 minutes to around 60 minutes, and wherein the diluted cross-linking agent comprises a cross-linking agent and a solvent in a 1:9 ratio, wherein the complex starch mixture is cross-linked with the diluted cross-linking agent at the raised temperature of the complex starch mixture;

(4) drying the cross-linked starch mixture; and (5) milling and/or pulverizing the cross-linked starch mixture to a desired particle size;

combining the fluid loss control additive with the wellbore servicing fluid, wherein the wellbore servicing fluid comprises a monovalent or divalent brine; and performing a drilling operation in a subterranean formation, wherein the wellbore servicing fluid with the fluid loss control additive is introduced into a wellbore in contact with the subterranean formation during the drilling operation.

7. The method according to claim 6, wherein the starch is selected from the group consisting of corn, wheat, rice, maize, waxy maize, potato, sago, soy, tapioca, and blends thereof.

8. The method according to claim 6, wherein the alkali is selected from the group consisting of sodium hydroxide, potassium hydroxide, sodium carbonate, potassium carbonate, sodium bicarbonate, and combinations thereof.

9. The method according to claim 6, wherein the fluid loss control additive is formulated to substantially reduce fluid loss at a wellbore temperature ranging between about ambient temperature and about 350° F.

10. The method according to claim 6, wherein the cross-linking agent is selected from the group consisting of epichlorohydrin, epoxy compounds, phosphorous oxychloride, cyanuric chloride, formaldehyde and combinations thereof.

11. The method according to claim 6, wherein the solvent is selected from the group consisting of isopropyl alcohol, n-propyl alcohol, methyl alcohol and ethyl alcohol, wherein the solvent provides a medium for an uniform mixing of the cross-linking agent with the starch.

12. The method according to claim 6, wherein the wellbore servicing fluid further comprises at least one component selected from a group consisting of weighting agents, oxygen scavengers, biocides, pH modifiers, viscosifiers, surfactants, corrosion inhibitors, lubricants, friction inhibitors, scale inhibitors, and high temperature stabilizers.

13. A method for reducing fluid loss from a water-based wellbore servicing fluid, comprising:

(A) preparing a fluid loss control additive, consisting:

(1) dry mixing a natural starch and sodium monochloroacetate (SMCA) for a first predetermined reaction time period to form a dry mixture, wherein the first predetermined reaction time period is around 20 minutes to around 40 minutes;

(2) alkalization of the dry mixture by spraying an alkaline solution onto the dry mixture from step (1) for a second predetermined reaction time period to form a complex starch mixture, wherein the alkaline solution comprises about 20 to 40 parts of an alkali dissolved in about 60 to 80 parts of water, wherein the second predetermined reaction time period is around 45 minutes to around 75 minutes;

(3) treating the complex starch mixture for a third predetermined reaction time period with a diluted cross-linking agent to form a cross-linked starch mixture, wherein the third predetermined reaction time period is around 20 minutes to around 60 minutes, and wherein the diluted cross-linking agent comprises a cross-linking agent and a solvent in a 1:9 ratio;

(4) drying the cross-linked starch mixture; and (5) milling and/or pulverizing the cross-linked starch mixture to a desired particle size;

(B) combining the fluid loss control additive with the wellbore servicing fluid, wherein the wellbore servicing fluid comprises a monovalent or divalent brine; and (C) performing a drilling operation in a subterranean formation, wherein the wellbore servicing fluid with the fluid loss control additive is introduced into a wellbore in contact with the subterranean formation during the drilling operation.

* * * * *